United States Patent [19]

Nielsen

[11] Patent Number: 4,677,447

[45] Date of Patent: Jun. 30, 1987

[54] INK JET PRINTHEAD HAVING A PRELOADED CHECK VALVE

[75] Inventor: Niels J. Nielsen, Corvallis, Oreg.

[73] Assignee: Hewlett-Packard Company, Palo Alto, Calif.

[21] Appl. No.: 842,594

[22] Filed: Mar. 20, 1986

[51] Int. Cl.⁴ .......................................... G01D 15/16
[52] U.S. Cl. ................................ 346/140 R; 137/854; 137/526
[58] Field of Search ................ 346/140; 137/854, 843, 137/526

[56] References Cited

U.S. PATENT DOCUMENTS

| | | | |
|---|---|---|---|
| 3,983,857 | 10/1976 | O'Connor | 137/854 X |
| 4,500,895 | 2/1985 | Buck | 346/140 |
| 4,509,062 | 4/1985 | Low | 346/140 |
| 4,513,784 | 4/1985 | Ferrand | 137/854 |
| 4,514,742 | 4/1985 | Suga | 346/140 |

Primary Examiner—Joseph W. Hartary
Attorney, Agent, or Firm—William J. Bethurum

[57] ABSTRACT

A preloaded check valve disposed in a valve body between an ink reservoir and a printhead has a valve opening pressure or "cracking" pressure at least sufficient to overcome the hydrostatic pressure due to gravity of ink in the reservoir. This prevents depriming or leakage of ink at the orifices of the orifice plate forming part of the ink ejecting mechanism. Ejection of ink during printing creates a pressure differential across the valve sufficient to cause it to open and replenish the ink supply at the ink ejecting mechanism.

3 Claims, 2 Drawing Figures

INK JET PRINTHEAD HAVING A PRELOADED CHECK VALVE

TECHNICAL FIELD

This invention relates generally to ink jet printheads, and more particularly to an ink jet printhead having an ink reservoir in which provision is made to prevent ink leakage from the orifice plate in normal handling and in use.

BACKGROUND ART

Portable or disposable ink jet printheads having attached ink reservoirs require provision to contain the ink during handling as well as in use. Without some provision for containing the ink when the orifice plate is face down, only the surface area mechanics at the orifices operate to contain the ink and this is usually inadequate.

Various techniques for preventing ink leakage at the orifice plate have been proposed. Probably the simplest is to apply a pressure sensitive adhesive tape to the orifice plate to seal the orifice. However, the removal of such tape places the delicate orifice plate at risk to damage and may induce ink leakage at one or more of the orifices. Additionally, the adhesive material if in contact with the orifice plate adjacent to and over the orifices may contaminate the orifices or change the characteristics of the orifice plates sufficiently to degrade print quality.

Foam is also used in the reservoir to retain the ink. Hereagain, surface energy mechanics is a factor in retaining ink in the interstices or the cells in the foam. Pressure reductions when ink is ejected by the ink head are usually sufficient to maintain an uninterrupted ink supply at the orifice plate. Volumetric effeciency however in the use of foam is only about 60 to 65 percent in most applications.

U.S. Pat. No. 4,509,062 entitled "Ink Reservoir With Essentially Constant Negative Back Pressure", issued Apr. 2, 1985 and assigned to the assignee of this invention adresses this problem in an arrangement which maintains a substantially constant negative back pressure slightly greater than the maximum anticipated ink hydrostatic head. This negative back pressure is maintained by the utilization and maintenance of a nonlinear force in an elastic section of the ink reservoir of the printhead.

DISCLOSURE OF THE INVENTION

While the approach of U.S. Pat. No. 4,509,062 above offers a viable solution to the problem of ink leakage, an arrangement in accordance with the present invention and providing a positive seal of the ink reservoir is to be preferred. When the reservoir is sealed the hydrostatic head at the orifice plate is reduced. Now only the hydrostatic head of the small ink prime in the cavity between the reservoir and the orifice plate is effective to exert ink pressure at the orifices, significantly reducing the probability of ink leakage thereat.

In implementing this approach to resolving the ink leakage problem, this invention provides a valve body having an opening therethrough. A reservoir is connected to one side of the valve body to supply ink to said opening and a printing substrate assembly comprising a substrate having an orifice plate thereon is sealed to the other end of the valve body defining a small cavity between the substrate and the valve body adjacent the opening. The ink prime is contained in this cavity.

An elastically loaded valve member seals the end of the opening at the cavity. The elastic loading establishes a value of opening pressure of the valve greater than the maximum anticipated hydrostatic pressure due to accelerating forces acting on the ink and the ink reservoir. When the printhead is operated to eject ink, pressure in the ink prime cavity drops. The pressure differential across the valve exceeds the valve opening pressure and the ink is supplied to the ink priming cavity. Thus, a continuous supply of ink is maintained for the printhead while the hydrostatic forces at the orifice plate under quiesent conditions are due only to the hydrostatic head of the ink in the cavity.

BEST MODE FOR CARRYING OUT THE INVENTION

Figure 1:
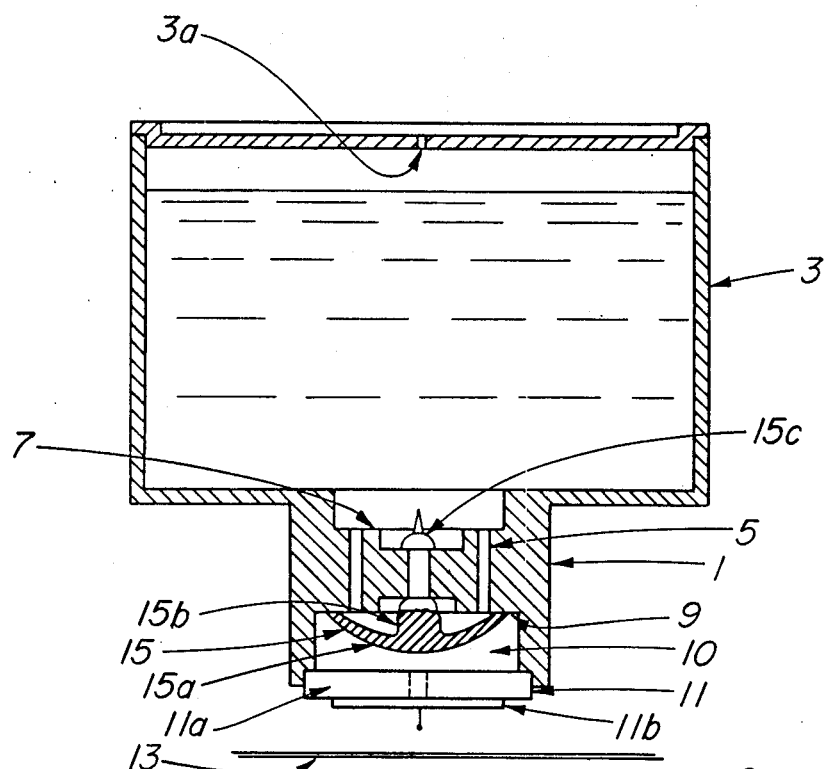
FIG. 1 is an enlarged cross sectional view of an ink jet printhead having a valve between an ink reservoir and the print substrate assembly.

Referring to FIG. 1, the printhead comprises a valve body 1 having an integrally formed or separately attached rigid ink reservoir 3. Such assemblies are usually molded from a plastic material which has good dimensional stability. In this case such a material may be sufficiently transparent so that the ink level in the reservoir 3 may be visually monitored. Openings 5 formed in the valve body 1, extending between the upper and lower valve body faces 7 and 9, as viewed, provide ink flow between the reservoir 3 and the printing substrate assembly 11. The printing substrate assembly 11 is sealed in the open end of the bottom of the valve body 1 in a position spaced from the lower face 9, defining a small cavity 10 which must be primed with ink for the printing substrate assembly to function properly in ejecting ink to impinge upon paper 13 during a printing operation. Only the relative positions of the printhead body and the paper are shown, it being understood that both the paper and the printhead body are selectively moved in orthogonal paths during a printing operation. The printhead assembly comprises a substrate 11a and an orifice plate 11b. Thermal excitation is used to eject ink. Thermal ink jet printheads are described in the Hewlett Packard Journal, May 1985, Vol. 36, No. 5, beginning on page 4 which material is incorporated herein by reference. The invention is not limited however to this specific type of printhead assembly. The invention is equally useful in applications involving other methods for ejecting the ink.

A valve 15 is employed to control the transfer of ink between the reservoir 3 and the cavity 10. The valve illustrated is a rubber diaphram type of valve functioning as a check valve to prevent depriming of the cavity 10. It comprises an elastic umbrella shaped diaphram 15a having a peripheral edge which seats upon the surface 9 and provides a peripheral seal surrounding the openings 5 through the valve body. The valve 15 comprises an integrally formed valve stem having an enlarged base section on the inner side of the umbrella shaped diaphram and an enlarged end 15c. The enlarged end 15c is forced through a central hole in the valve body, projecting through the upper end as viewed to engage the upper surface of the valve body. The enlarged base section 15b engages the lower face of the valve body. The peripheral edge of the diaphram is seated and sealed against the surface 9. This deflects the diaphram 15a and preloads its peripheral edge against the surface 9. In this position, the preloading establishes a valve opening pressure or valve cracking pressure in excess of the hydrostatic pressure resulting at least from the maximum depth of ink in the reservoir 3.

Each time the printing head assembly 11 is fired to eject ink onto the paper 13, the pressure in the cavity is reduced. The diaphram valve 15 opens replenishing the ink in the primary cavity 10 for that which has been ejected.

The use of the check valve such as the diaphram valve is advantageous in that the check valve action prevents deprimes. Further, neither the introduction of foam in the reservoir nor the use of the elastic bladder is necessary to prevent gravitationally induced ink leakage through the orifices. Further, there is an easy visual indication of the ink supply in the reservoir if the reservoir has clear body walls.

The use of a rigid reservoir as seen in FIG. 1 offers certain advantages in that the ink can be "loose". If the printhead is filled and primed with ink as manufactured, the air hole 3a in the cover may be sealed with a tape which is removed after the printhead is installed in the printing mechanism. Alternatively a check valve may be used for this purpose.

Figure 2:
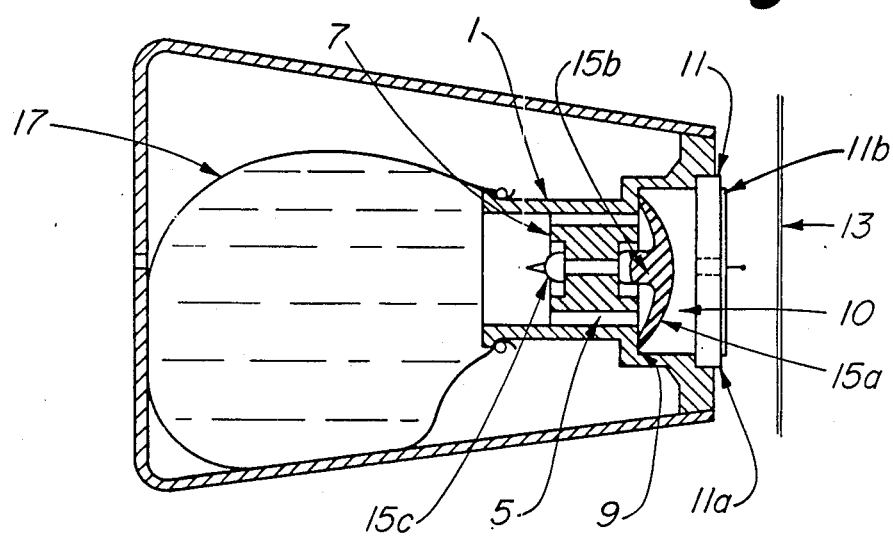
FIG. 2 is an enlarged cross sectional view of an ink jet printhead of the type in FIG. 1 employing a flexible or limp bladder as the ink reservoir.

The invention may be practiced with other than a rigid reservoir such as that shown in FIG. 1. FIG. 2 shows the use of a "limp" bladder 17 installed as the reservoir. The use of the bladder eliminates the need for a tape seal or a check valve on the air return vent 3a, as seen in FIG. 1. The limp bladder is sealed to the upper body projection of the valve, in FIG. 2, at the time of manufacture.

Only one type of check valve has been illustrated herein. It will be appreciated however, that any type of check valve may be employed which can be preloaded in the closed position. Other typical valves may include, but without limitation, reed valves, spring loaded ball valves, and duck billed valves for example. In all cases, the valve preload derived opening pressure or cracking pressure is chosen to exceed the gravity head by an appropriate safety margin to account for manufacturing tolerances, but not to exceed an opening pressure requirement which would interfere with the ejection of ink when the printhead is fired.

INDUSTRIAL APPLICABILITY

The invention is applicable in any printhead where depriming or ink leakage must be prevented.

I claim:
1. An inkjet printhead, comprising:
   a. a valve body having an opening therethrough;
   b. an ink supply reservoir connected to said valve body on one side thereof in a position providing an ink supply above said opening for supplying ink by gravity induced flow to said opening;
   c. a printhead mounted on said valve body on the other side of said opening in a position spaced from said opening and forming a cavity for receiving ink by gravity induced flow from said opening and ejecting ink for printing; and
   d. a valve member sealing said opening, supported within said valve body in said cavity, having an opening pressure greater than the gravitational hydrostatic pressure of ink in said reservoir, and responding to reduced ink pressure in said cavity upon ejection of ink therefrom by said printhead, to open and admit ink to said cavity by gravity induced flow from said reservoir through said opening.
2. The invention according to claim 1, comprising:
   a. a face portion surrounding the end of said opening in said cavity, said valve having an umbrella shaped portion of a flexible material terminating in a peripheral edge seated upon said face portion surrounding and sealing said opening.
3. The invention according to claim 1, in which:
   a. said ink supply reservoir comprises a collapsible bladder having only one open end which is sealed to said valve body on said one side thereof for supplying ink by gravity induced flow to said opening.

* * * * *